June 26, 1956 E. GEDDE 2,751,874
CAN BODY SIDE SEAM SOLDER FLUXING MECHANISM
Filed Nov. 6, 1952 3 Sheets-Sheet 1

INVENTOR.
ERIK GEDDE
BY
ATTORNEYS

June 26, 1956 — E. GEDDE — 2,751,874
CAN BODY SIDE SEAM SOLDER FLUXING MECHANISM
Filed Nov. 6, 1952 — 3 Sheets-Sheet 2
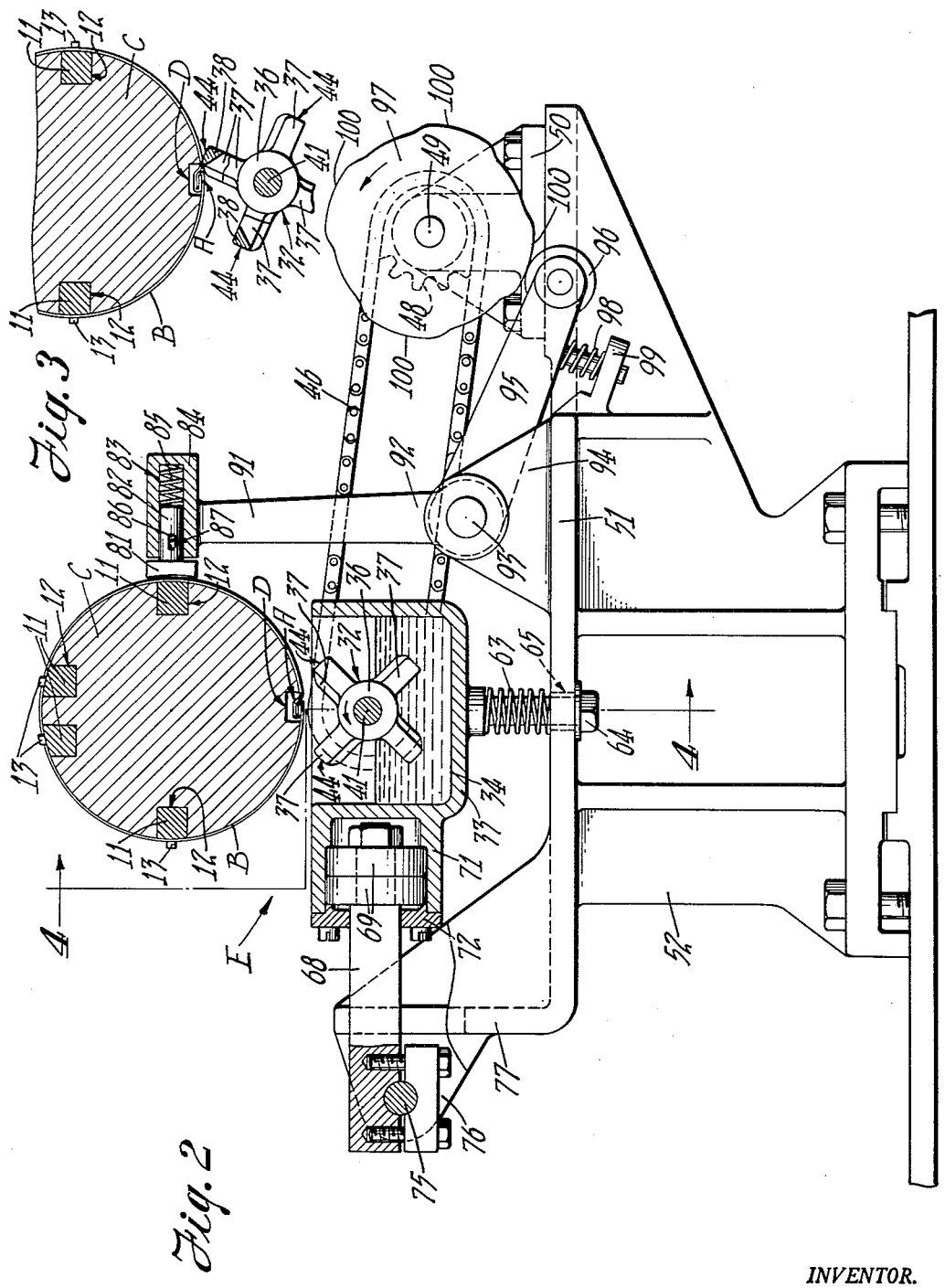
INVENTOR.
ERIK GEDDE
BY
Charles H. Gene
Leland R. McCann
George W. Reiber
ATTORNEYS

United States Patent Office 2,751,874
Patented June 26, 1956

2,751,874

CAN BODY SIDE SEAM SOLDER FLUXING MECHANISM

Erik Gedde, Park Ridge, Ill., assignor to American Can Company, New York, N. Y., a corporation of New Jersey Application November 6, 1952, Serial No. 319,022

10 Claims. (Cl. 113—95)

The present invention relates to a solder fluxing mechanism for can or container body making machines and has particular reference to such a mechanism having a novel flux applying element and a yieldably mounted flux pot for effecting self-alignment of the applying element with the side seams of container bodies to be fluxed preparatory to soldering.

An object of the invention is the provision of a solder fluxing mechanism for a container body making machine wherein uniform engagement of the flux applying element may be had with the side seam of a container body so as to insure an even distribution of the flux along the seam.

Another object is the provision of such a fluxing mechanism wherein a yieldable mounting for the flux pot provides for self-aligning pressure engagement between the flux applying element and the container body side seam to compensate for any bowing of the seam so as to insure uniform engagement of the applying element along the seam.

Another object is the provision of such a fluxing mechanism wherein the self-alignment of the applying element relative to the side seam of a container body is effected through yieldable mountings for the flux pot which carries the applying element so that the flux pot is free to move in a vertical direction toward and away from the side seam and to tilt longitudinally of the seam while maintaining the applying element in register with the seam.

Another object is the provision of such a fluxing mechanism wherein the flux applying element may be rotated slowly in the bath of flux in the pot to avoid splashing and churning of the flux without in any manner reducing the efficiency and high-speed rate of production.

Numerous other objects and advantages of the invention will be apparent as it is better understood from the following description, which, taken in connection with the accompanying drawings, discloses a preferred embodiment thereof.

Referring to the drawings:

Fig. 2 is a side elevation of the mechanism shown in Fig. 1, in proper relation to a container body supporting horn of a body making machine, the horn and parts of the mechanism being shown in section;

Fig. 3 is a fragmentary sectional view showing the fluxing position of an applying element and a container body on the horn to receive the flux.

Figure 4:
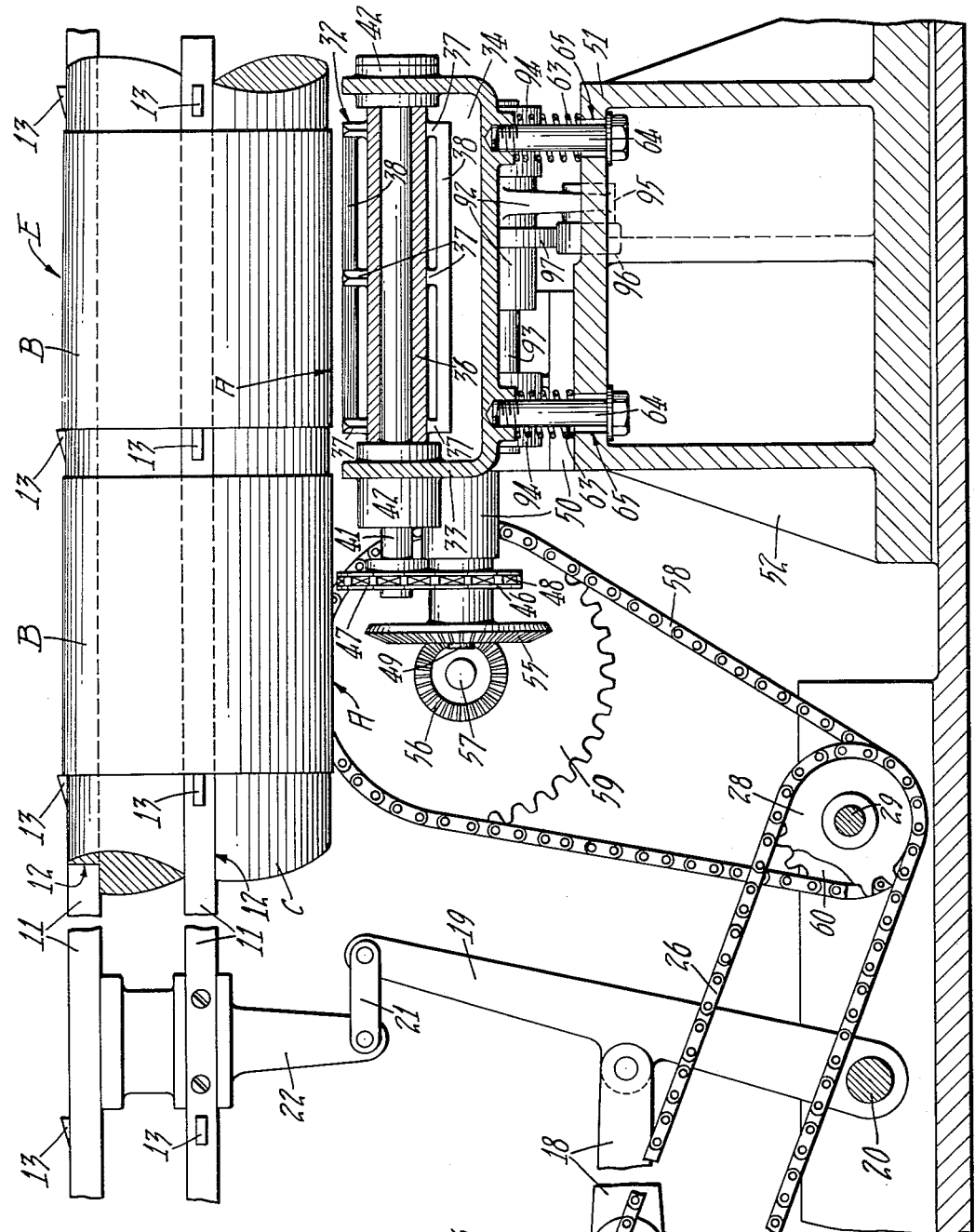
Fig. 4 is a longitudinal vertical sectional view taken substantially along the broken line 4—4 in Fig. 2.

As a preferred or exemplary embodiment of the instant invention the drawings disclose a fluxing mechanism for applying liquid flux to side seams A (Figs. 2 and 4) of tubular sheet metal can or container bodies B supported on a horizontally disposed mandrel or horn C of a container body making machine such as the machine disclosed in United States Patent 1,770,041, issued July 8, 1930, to John F. Peters on Roll Bodymaker. As in the instance of this Peters patent, the container bodies B are advanced intermittently with their side seams A disposed in a groove D extending longitudinally of and formed in the bottom of the horn C. This advancement of the bodies along the horn is effected by a plurality of reciprocable feed bars 11 which operate in slide grooves 12 in the horn and which feed bars carry spring held depressible feed dogs 13 for engaging behind the container bodies to effect their advancement. For this purpose the feed bars 11 are connected together and are reciprocated in unison through a forward or feeding stroke toward the right as viewed in Fig. 4 and thence through a return stroke.

Reciprocation of the feed bars 11 is effected by an eccentric disc 16 which is carried on a continuously rotating eccentric shaft 17 journaled in suitable bearings formed in a machine frame as shown in the Peters patent above mentioned. The eccentric actuates a connecting rod 18 which is connected to and rocks an upright arm 19 mounted at its lower end on a pivot shaft 20 carried in the machine frame. The upper end of the arm 19 is connected by a link 21 to a block 22 to which all of the feed bars 11 are secured for movement in unison.

Continuous rotation of the eccentric shaft 17 is effected in the manner disclosed in the Peters patent, as by an endless chain 26 which operates over a sprocket 27 mounted on the eccentric shaft 17 and over a driving sprocket 28 carried on a main driving shaft 29 journaled in suitable bearings formed in the machine frame.

The fluxing of the side seam A of a container body B supported on the horn C preferably is effected while the body is at rest and while the feed bars 11 are moving through a return stroke. For this purpose the feed bars 11 advance the container bodies individually into and through a fluxing station E (Figs. 2 and 4) disposed adjacent the horn C. The fluxing mechanism is disposed at this station E and includes a rotatable fluxing or flux applying element 32 mounted in a substantially rectangular open top reservoir or flux pot 33 containing a bath 34 of liquid flux in which the partially submerged fluxing element 32 rotates. The flux pot 33 is yieldably or resiliently mounted and is disposed directly under the horn C with the flux applying element extending longitudinally of the horn, the axis of the applying element being substantially parallel to and in substantially vertical alignment with the axis of the horn.

Figure 1:
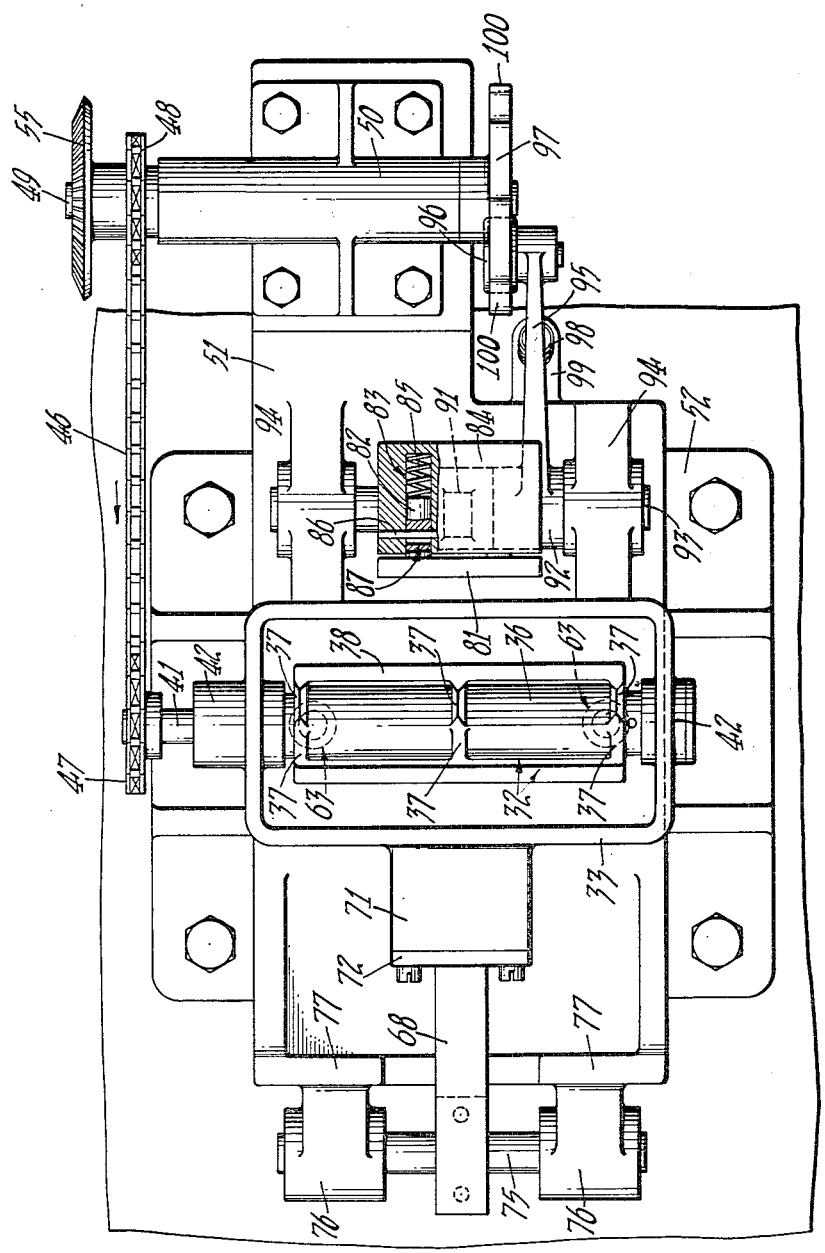
Figure 1 is a top plan view of a fluxing mechanism embodying the instant invention, with parts broken away and parts shown in section.

The flux applying element 32 preferably is of the paddle wheel or spider type and is formed with a longitudinal central hub 36 having at its opposite ends and intermedially thereof, four radially projecting legs 37 spaced apart at right angles and carrying blades 38 (Figs. 1, 3 and 4) which extend longitudinally of and are disposed parallel with the axis of the applying element. This applying element 32 is mounted on a continuously rotating driven shaft 41 journaled in bearings 42 in the opposite ends of the flux pot 33 for rotation in a counterclockwise direction as viewed in Fig. 2. In order to minimize splashing and churning of the liquid flux during rotation of the applying element 32, the leading edges of the legs 37 and the blades 38 are wedge shaped (as best shown in Fig. 3) so as to readily cut through the liquid. The outer or peripheral faces of the blades 38 constitute substantially flat lands 44 which pick up the liquid flux from the bath 34 and apply it with a wiping action to the side seam A of a container body B as the body, supported on the horn C, rests momentarily at the fluxing station E.

Rotation of the driven shaft 41 of the flux applying element is effected by an endless chain 46 (Figs. 1 and 2) which operates over a sprocket 47 carried on an end of the shaft 41 which projects outside of the flux pot 33, and over a sprocket 48 mounted on a driven shaft 49 journaled in a bearing bracket 50 bolted to a table 51 of a subframe 52 secured to the main frame of the container making machine.

The flux applying element 32 is rotated in time with the advancement of the container bodies B along the horn C in such a manner that as the element rotates, a container body is advanced into position at the fluxing station E by passage between adjacent circumferentially spaced radially extending blades 38 so that as soon as a body is positioned, a blade 38 immediately engages against and wipes transversely across the body side seam along its entire length. For this purpose the shaft 49 is driven from the main drive shaft 29 through a bevel gear 55 (Figs. 1 and 4) which is secured to the driven shaft 49. The bevel gear 55 meshes with and is driven by a bevel gear 56 mounted on a short shaft 57 journaled in suitable bearings in the machine frame. The shaft 57 is rotated continuously by an endless chain 58 which operates over a sprocket 59 on the shaft 57 and over a sprocket 60 carried by the main drive shaft 29.

The yieldable or resiliently mounted flux pot 33 under the horn C, is supported on a pair of spaced compression springs 63 located one adjacent each end of the pot and interposed between the bottom of the pot and the table 51 of the subframe 52. These springs are coiled around long studs 64 which extend up through clearance openings 65 in the table 51 and are threadedly engaged in the bottom of the flux pot. The heads of the studs, which engage against the bottom of the table 51 limit the upward travel of the flux pot under the force of the springs 63 and thus normally hold the flux pot in a predetermined projected position so that the space between the side seam of a container body at rest at the fluxing station E and the circumferential path of travel of the blades 38 of the rotating applying element 32 is insufficient to permit free rotation of the blades without contacting the side seams. As a result, a given blade 38 of the flux applying element 32 during its rotation, engages against the side seam A of a single momentarily stationary body B as shown in Fig. 3 and as it wipes past the seam, it forces the flux pot slightly downwardly against the resistance of the springs 63. The described yieldable mounting of the flux pot results in and creates a resilient pressure engagement between each blade 38 and the side seams A of successively positioned bodies and thus insures full contact of the blades with and along the entire length of the seams, even though a seam may be slightly bowed. The resilient spring pressure against the seam also serves to straighten the bowed portion and thus temporarily eliminates the bow.

In order to maintain the flux applying element 32 in vertically aligned relation with the container body side seam A during the fluxing action to insure uniform longitudinal engagement of the blades 38 with the seams A, the flux pot 33 is swivelly mounted on a vertically pivotable arm 68 (Figs. 1 and 2) which projects laterally from one side of the flux pot at right angles to the longitudinal axis of the horn C. The inner end of the arm 68 carries a pair of conventional ball bearings 69 which are secured to the arm and which are disposed and clamped in a housing 71 formed on the side of the flux pot. A cover 72 for the housing 71 clamps the ball bearings 69 in place. The ball bearings 69 constitute a swivel or rotatable mounting for the flux pot 33 and permit the pot to rotate or tilt vertically toward and away from the axis of the horn C and thus provides a self-aligning feature for the flux applying element 32, thereby permitting the blades 38 of the element to self-align themselves which the side seams to insure full engagement of the lands 44 of the blades along the entire length of the seams.

The outer end of the arm 68 is secured to a short horizontally disposed pivot shaft 75 rotatably supported in a pair of spaced bearings 76 formed on an upright web 77 of the table 51. This pivot shaft 75 holds the flux pot 33 with its applying element 32 in substantial parallelism with and in vertically aligned relation with the axis of the horn C and permits vertical movement of the flux pot toward and away from the horn as explained above.

During a side seam fluxing operation, the container body B being fluxed, preferably is held against rotation on the horn C. For this purpose a retractable clamping pad 81 is located adjacent the horn C at the fluxing station E and is normally held in a retracted position away from the horn. The clamping pad 81 (Figs. 1 and 2) extends longitudinally of the horn and is formed with a pair of slide pins 82 which are disposed in horizontal bores 83 formed in a horizontally movable carrier block 84. Compression springs 85 located in the outer ends of the bores exert a pressure against the ends of the slide pins 82 and thus impart yieldability to the clamping pad 81. The pins 82 are held against displacement from the bores by stop pins 86 which are secured in the block 84 and which extend transversely of the slide pins 82 through elongated slots 87 formed in the slide pins.

The carrier block 84 is formed on the upper end of an upright leg 91 of a bell crank 92 mounted on a horizontally disposed pivot shaft 93 carried in a pair of spaced bearing brackets 94 which extend up from the table 51 of the subframe 52. The other leg 95 of the bell crank 92 carries at its outer end a cam roller 96 which operates against an edge cam 97 mounted on and rotated by the shaft 49. A compression spring 98 interposed between the leg 95 of the bell crank 92 and a boss 99 projecting from the table 51, holds the cam roller 96 against the edge cam 97. The edge cam 97 preferably is formed with four low spots and four alternate high spots 100 corresponding to the four blades 38 of the flux applying element 32. Said high spots 100 respectively operate to rock the bell crank 92 in a counterclockwise direction (Fig. 2) once for each container body advanced into the fluxing station E, and thus serve to push the clamp pad 81 out of the path of a container body B being advanced into the station E. Just prior to the engagement of a fluxing blade 38 with the side seam A of the positioned body a said high spot rides off of cam roller 96, whereupon compression spring 98 urges said roller into a succeeding low spot in edge cam 97. This results in movement of the bell crank in the opposite or counterclockwise direction to yieldably force the pad 81 into clamping engagement with the positioned container body. The pad 81 remains in container clamping position until the blade 38 fluxes the side seam and then is retracted as described to permit advancement of the fluxed body along the horn for a subsequent soldering operation, and the movement of a succeeding body into the fluxing station.

Hence with such a fluxing mechanism, the container bodies B enter the fluxing station E while the fluxing element 32 is rotating, the bodies being advanced along the horn during the period in which two adjacent fluxing blades 38 are clear of the horn as shown in Fig. 2, the space between the blades providing clearance for the body so that no interference with the blades is encountered during the feeding and the positioning of a body at the fluxing station. When a container body is fully positioned at the station and while the feed bars 11 are moving back through a return stroke, the body is clamped by the clamping pad 81 and immediately a fluxing blade 38 engages and wipes across the side seam of the body to apply the flux thereto, the flux pot 33 tilting and yielding sufficiently to permit of a uniform pressure engagement of the blade with the seam, with the result that the flux is uniformly distributed along the entire length of the seam. Immediately upon completion of this fluxing operation, and while the next blade on the applying element is moving toward the horn, the fluxed body is unclamped and pushed out of the fluxing station as the next following body enters for fluxing. Hence the applying element 32 with four blades 38 makes only one full rotation for each four container bodies B and hence by comparison rotates relatively slowly without splashing of the flux in the pot and without sacrifice of desirable high production capacity of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a mechanism for applying a liquid flux to the side seams of container bodies, the combination of a horn for supporting the bodies, feeding means for intermittently advancing the container bodies along said horn in spaced end to end relation to and through a fluxing station, a flux pot movably mounted below said horn at said fluxing station for retaining a bath of liquid flux, a rotatable substantially cylindrical flux applying element fixedly mounted on said flux pot with its axis of rotation disposed in substantial parallelism with the axis of said horn, said applying element having circumferentially spaced radially projecting blades extending longitudinally of said horn, each of said blades terminating in a continuous longitudinal land for transverse wiping engagement against the side seam of a container body advanced to said station, means for continuously rotating said applying element in said flux pot in time with the intermittent movement of said feeding means to effect advancement of a container body into said station and into the space between adjacent blades of said applying element and thereafter to wipe onto the entire side seam of the container body at said station the flux picked up from said bath by the trailing blade of said adjacent blades, and a yieldable mounting for said flux pot to provide resilient pressure engagement between the flux wiping land of said rotating applying element and said side seam throughout its longitudinal extent and to insure uniformity of said wiping engagement along the entire length of said side seam.

2. In a mechanism for applying a liquid flux to the side seam of a container body, the combination of an elongated horn for supporting the container body, means for advancing the container body along said horn to and through a fluxing station, a flux pot below said horn at said fluxing station for retaining a bath of liquid flux, means mounting said flux pot for pivotal movement on an axis transverse to that of said horn, an elongated flux applying element journaled in said flux pot and having means for rotating the same on an axis substantially parallel to the axis of said horn, said flux applying element being longitudinally engageable with the side seam of the container body advanced to said station for picking up flux from said pot and for applying it to said side seam in a direction transversely thereof and throughout its entire length, and spring means for urging said flux pot upwardly toward said horn to insure uniform engagement of said flux applying element with said side seam throughout its entire longitudinal extent for a single flux applying operation.

3. In a mechanism for applying a liquid flux to the side seam of a container body, the combination of a horn for supporting the container body, means for advancing the container body along said horn to and through a fluxing station, a flux pot removably mounted beneath said horn at said fluxing station for retaining a bath of liquid flux, an elongated flux applying element rotatably mounted on said flux pot, said element being longitudinally engageable with the side seam of the container body at said station for picking up flux from said pot and for applying it to said side seam in a direction transversely thereof and throughout its entire length, a swivel mounting for supporting said flux pot intermediate its opposite ends for pivotal movement in a substantially vertical plane towards and away from said horn, and resilient means engaging beneath said flux pot for urging the pot upwardly toward said horn to insure uniform engagement of said elongated flux applying element with said side seam throughout the entire longitudinal extent of the container body being fluxed.

4. In a mechanism for applying a liquid flux to the side seam of a container body, the combination of an elongated horn for supporting said body, means for advancing the container body along said horn to and through a fluxing station, a flux pot movably mounted beneath said horn at said station for retaining a bath of liquid flux, an elongated flux applying element rotatably mounted on said flux pot, said element being longitudinally engageable with the side seam of a container body positioned at said station for picking up flux from said pot and for applying it to said side seam in a direction transversely thereof and throughout its entire length, resilient means for urging said flux pot upwardly toward said horn, and a swivel mounting supporting said flux pot intermediate its ends for tilting movement towards and away from said horn in a vertical plane aligned with the horn axis to insure uniform engagement of said elongated flux applying element with said side seam throughout the entire longitudinal extent of the latter.

5. In a mechanism for applying a liquid flux to the side seam of a container body, the combination of an elongated horn for supporting the container body, means for advancing the container body along said horn to and through a fluxing station, a flux pot movably mounted beneath said horn at said station for retaining a bath of liquid flux, an elongated flux applying element rotatably mounted on said flux pot, said element being longitudinally engageable with the side seam of the container body at said station for picking up flux from said pot and for applying it to said side seam in a direction transversely thereof and throughout its entire length, spring means for yieldably and continuously urging said flux pot upwardly toward said horn, means for retaining said flux pot and the flux applying element mounted thereon in longitudinal alignment with the path of travel of the side seam of the container body on said horn, and a swivel mounting for pivotally supporting said flux pot intermediate its ends for longitudinal tilting movement in a vertical plane aligned with the horn axis to insure uniform engagement of said elongated flux applying element with said side seam throughout its entire longitudinal extent.

6. In a mechanism for applying a liquid flux to the side seam of a container body, the combination of a horn for supporting the container body, feeding means for advancing the container body along said horn to and through a fluxing station, a flux pot movably mounted beneath said horn at said fluxing station for retaining a bath of liquid flux, an elongated flux applying element mounted on said flux pot and having means for rotating the same on an axis disposed substantially parallel to the axis of said horn, said applying element being longitudinally engageable with the side seam of the container body at said station for picking up flux from said pot and for applying it to said side seam in a direction transversely thereof and throughout its entire longitudinal extent, spaced spring means disposed beneath said flux pot for yieldably urging the same and said applying element toward said horn, a support arm extending from said flux pot at right angles to the longitudinal axis of said horn, one end of said arm being rotatable in a housing attached to said flux pot and supporting said pot for tilting movement in a vertical plane aligned with the horn axis, the opposite end of said arm being pivotally mounted on a horizontal axis remote from said horn for retaining the flux applying element in said flux pot in longitudinal alignment with the path of travel of the side seam of the container body on said horn.

7. In a mechanism for applying a liquid flux to the side seam of container bodies, the combination of a horn for supporting the container bodies, means for intermittently advancing said bodies along said horn to and through a fluxing station, a flux pot movably mounted below said horn at said fluxing station for retaining a bath of liquid flux, an elongated flux applying element rotatably mounted on said flux pot with its axis disposed in substantial parallelism with the axis of said horn, said applying element having a plurality of radially projecting elongated lands extending longitudinally of said horn respectively for transverse wiping engagement against the side seam of a said container body at said station for the full length of the seam, means for continuously rotating said applying element in said flux pot in time with the intermittent advance of said bodies to pick up flux from said bath by said lands for application to said container side seams, and a yieldable resilient mounting for said flux pot for exerting upward pressure thereagainst and against said applying element to insure uniformity of wiping engagement of said lands respectively along the entire length of successive container side seams.

8. In a mechanism for applying a liquid flux to the side seams of container bodies, the combination of a horn for supporting the container bodies, means for intermittently advancing the container bodies in spaced end to end relation along said horn to and through a fluxing station, a flux pot movably mounted below said horn at said fluxing station for retaining a bath of liquid flux, a rotatable substantially cylindrical flux applying element mounted on said flux pot in fixed relation thereto with its axis in substantial parallelism with the axis of said horn, said applying element having a plurality of radially projecting elongated lands extending longitudinally of said horn for respective transverse wiping engagement with the side seam of a container body advanced to said station, means for continuously rotating said applying element lands in said flux pot in time with the intermittent advance of said bodies to pick up flux by said lands and to apply it to a said container side seam, means for yieldably supporting said flux pot to provide successive upward resilient pressure engagement of said applying element lands throughout their longitudinal extent against said container side seams to insure uniformity of said wiping engagement along the entire length of a said side seam, and stop means operable against said flux pot for holding the same in a predetermined vertical position relative to said horn in the intervals between the disengagement and the engagement of successive lands of said rotating applying element with the side seams of container bodies.

9. In a mechanism for applying a liquid flux to the side seams of container bodies, the combination of a horn for supporting said container bodies, means for intermittently advancing the container bodies along said horn to and through a fluxing station, a flux pot movably mounted below said horn at said fluxing station for containing a bath of liquid flux, a substantially cylindrical flux applying element rotatably mounted on said flux pot with its axis of rotation disposed in substantial parallel- ism with the axis of said horn, said rotatable applying element having a plurality of elongated radially projecting lands extending longitudinally thereof and in substantial parallelism with said horn for individual transverse wiping engagement of each with the side seam of a container body advanced to and positioned at said station, means for clamping said positioned container body on said horn at said station against rotation relative to the horn to hold said container side seam in predetermined position, means for continuously rotating said applying element in time with the intermittent advance of said bodies to pick up flux on said lands for transverse application by a single land onto the side seam of a said positioned container, and a yieldable mounting for said flux pot to provide resilient pressure engagement between said single flux wiping blade land and said side seam to insure uniformity of said wiping engagement along the full length of a said blade and container side seam for a complete flux wiping operation.

10. In a mechanism for applying a liquid flux to the side seams of container bodies, the combination of a horn for supporting said bodies, means for intermittently advancing container bodies along said horn to and through a fluxing station, a flux pot movably mounted below said horn at said fluxing station for retaining a bath of liquid flux, a rotatable substantially cylindrical flux applying element rigidly mounted on said flux pot with its axis of rotation disposed in substantial parallelism with the axis of said horn, said applying element including a plurality of circumferentially spaced radially projecting blades extending longitudinally thereof and of said horn, said blades terminating at their outer ends in a plurality of continuous longitudinal lands having respective transverse wiping engagement with the side seams of successive container bodies advanced to said station, means for continuously rotating said applying element in said flux pot in time with the intermittent advance of said bodies to wipe onto the side seam of a container body at said station the flux picked up from said bath by one of said lands, and a yieldable mounting for said flux pot to provide an upward resilient pressure engagement between a land of said applying element and said side seam to insure uniformity of said wiping engagement along the entire length of said side seam.

References Cited in the file of this patent

UNITED STATES PATENTS

| | | |
|---|---|---|
| 960,310 | Graham | June 7, 1910 |
| 962,945 | Coyle | June 28, 1910 |
| 1,058,439 | Karp | Apr. 8, 1913 |
| 1,476,405 | Kronquest | Dec. 4, 1923 |
| 1,773,890 | Taylor | Aug. 26, 1930 |
| 1,939,723 | Peters | Dec. 19, 1933 |
| 2,387,736 | Bierman | Oct. 30, 1945 |
| 2,460,866 | Wobbe et al. | Feb. 8, 1949 |
| 2,539,988 | Calles et al. | Jan. 30, 1951 |
| 2,690,005 | Schoenfeld | Sept. 28, 1954 |

FOREIGN PATENTS

| | | |
|---|---|---|
| 992,786 | France | Oct. 23, 1951 |